United States Patent [19]

Hendershot

[11] Patent Number: 4,862,944
[45] Date of Patent: Sep. 5, 1989

[54] SUN SHIELD

[76] Inventor: Michael C. Hendershot, 1025 Asbury, Evanston, Ill. 60202

[21] Appl. No.: 258,511

[22] Filed: Oct. 17, 1988

[51] Int. Cl.⁴ .............................................. B60J 3/00
[52] U.S. Cl. ................................ 160/370.2; 160/354; 160/DIG. 3
[58] Field of Search ................ 160/370.2, 368.1, 354, 160/DIG. 2, DIG. 3; 296/97.2, 97.7, 97.9

[56] References Cited

U.S. PATENT DOCUMENTS

| | | | |
|---|---|---|---|
| 3,475,080 | 10/1969 | Shumway | 296/97.2 X |
| 3,868,293 | 2/1975 | Selph | 296/97.7 X |
| 4,025,103 | 5/1977 | Eichstaedt | 160/370.2 X |
| 4,079,772 | 3/1978 | Klaenhammer et al. | 160/268.1 |
| 4,181,350 | 1/1980 | Eichstaedt | 160/370.2 X |
| 4,261,649 | 4/1981 | Richard | 296/97.7 X |
| 4,528,232 | 7/1985 | Cliffe | 296/97.2 X |
| 4,749,222 | 6/1988 | Idland | 296/97.7 X |
| 4,768,823 | 9/1988 | Martinez | 160/370.2 X |

Primary Examiner—Alvin C. Chin-Shue
Assistant Examiner—David M. Purol
Attorney, Agent, or Firm—Paul H. Gallagher

[57] ABSTRACT

A main panel member of translucent tinted plastic material, with mounting strips at opposite side edges of the panel member. The mounting strips are of plastic cling material, secured to the panel member by adhesive material. The cling strips adhere to a glass window by static.

10 Claims, 1 Drawing Sheet

HIGHLY EXAGGERATED 4,862,944

SUN SHIELD

FIELD OF THE INVENTION:

The invention resides in the field of sun shields for windows, that can be applied to the window by fitting it thereagainst, and without requiring additional mounting means, such as brackets, etc. The sun shield can be removed from the window by merely lifting it off.

OBJECTS OF THE INVENTION:

A broad object of the invention is to provide a sun shield or shade for windows, of the kind that can be mounted on the window by applying it against the window, having the following features and advantages:

1. It can be applied to a window, and removed therefrom, without in any way adversely affecting the window or sun shield, so that the sun shield can be repeatedly so applied to and removed from the window.

2. The sun shield does not have any exposed surfaces or elements that interfere with its handling or storing, such as having adhesive material on any such exposed surfaces, and thereby it is well adapted for use in automobiles or cars.

3. The sun shield is made up of materials that are standard, and easily accessible, and therefore of relatively low cost.

DESCRIPTION OF A PREFERRED EMBODIMENT:

Figure 1:
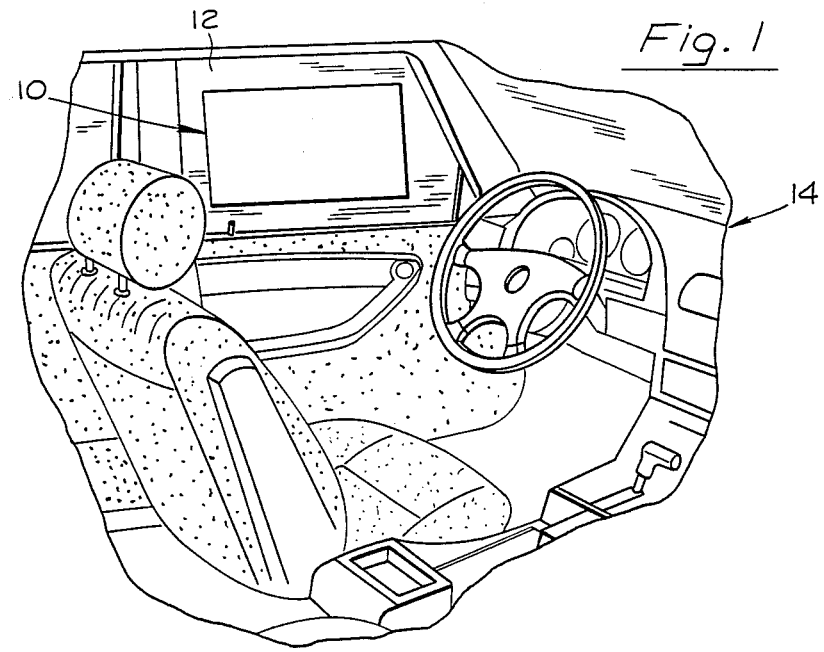
FIG. 1 is a perspective view of a portion of the interior of an automobile, showing a sun shield of the invention applied to the window thereof.

Referring in detail to the drawings, FIG. 1 shows the sun shield of the invention indicated generally at 10, applied to a window 12 of an automobile, the latter being indicated in its entirety at 14.

Figure 2:
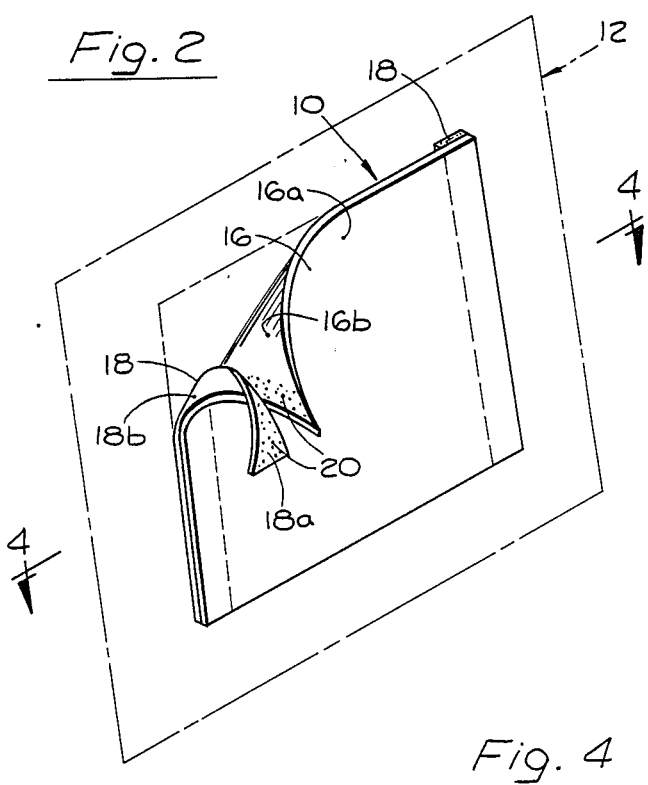
FIG. 2 is a perspective view of a sun shield of the invention, applied to a window, such as in FIG. 1, and showing a corner of the sun shield peeled away from the window.
Figure 3:
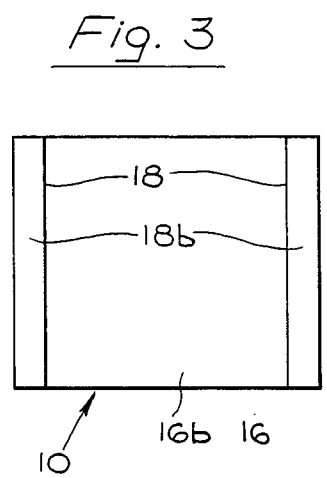
FIG. 3 is a face view of the inner surface of the sun shield.
Figure 4:
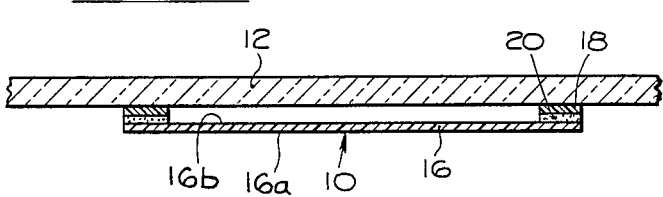
FIG. 4 is a sectional view taken at line 4—4 of FIG. 2 and including the window.

Referring particularly to FIGS. 2-4, the sun shield 10 is in the overall form of a panel and includes a main panel member 16, mounting strips 18 at opposite edges, and adhesive material 20 securing the mounting strips to the panel member. Each of these elements will be described in detail hereinbelow.

The sun shield may be of any desired size and shape, and preferably is smaller than the window or window area to which it is to be applied, for convenience in manipulating it.

For convenience in identifying the elements, the panel member 16 has a front or outer surface 16a, and a rear or inner surface 16b. Each mounting strip has an inner surface 18a and an exposed surface 18b.

Adhesive material 20 is utilized for securing the mounting strips 18 to the panel member 16.

The panel member 16 is of plastic material, and tinted to reduce the light transmission therethrough. The tinting may be of any of various colors, and such a plastic material is known on the market. A polyester material of biaxially oriented material, and metalized polyester, each is suitable for the purpose. Also usable are co-extruded polyester, acetate, and polycarbonate. These tinted objects are often referred to as being transparent, but because of the tinting material, the transparency is of course not perfect, but they are highly translucent, and as referred to herein, translucent refers to such materials that are highly translucent and seemingly transparent. The material of the panel member 16 does not have static properties, and does not cling to a window, but remains free of adherence thereto.

The mounting strips 18 are of material known as cling material, also an item that is found on the market. They are of electro-static vinyl material, monomeric vinyl. This cling material possesses static electricity, often referred to simply as static, whereby the material readily clings to glass, and other smooth surfaces, by the effects of the static. It does not lose its static characteristics by fitting it to the window, and removing it therefrom, and can be so applied repeatedly, and from a practical standpoint, indefinitely.

A principal feature of the invention is the utilization of such materials of which the panel member 16 and mounting strips 18 are composed, and securing the mounting strips on the panel member by a means that does not impair the static characteristics of the mounting strips, or does not in any way impair the nature of the panel member. Such an adhesive material is now on the market, and one such form is monomeric vinyl. That adhesive material which may also be referred to as a cement, is clear, and from a practical standpoint is entirely transparent. It may be applied to the mounting strips on one side thereof, side 18a, and then the mounting strips applied to the mounting panel by fitting them against the panel member on the inner side thereof at opposite edges. The mounting strips are then pressed firmly against the panel member so that they interengage throughout their common areas, and flattened so that there are no bubbles or spaces therebetween, and so that the adhesive material engages both the members throughout the common areas of those elements.

Such an adhesive material now on the market is known as 3M Scotch 467 HI Performance adhesive laminate. It may be applied, in the present case, by applying it directly to the surface of the mounting strips, but also the mounting strips may be obtained on the market in a laminate form, that is, such a strip or cling strip is provided with a protective cover, secured thereto by the same adhesive material to be used herein, and then the protective cover is peeled off of the cling strip with a portion of the adhesive material still adhering to the cling strip, and then the cling strip is applied to the panel member with the adhesive material of course then securing the cling strips to the panel member.

Certain of the adhesives referred to above are of pressure sensitive character, and the invention is sufficiently broad to include such. Also, among the usable adhesives is water clear adhesive.

The cling strips are preferably clear, and barely noticeable when applied to the panel member, especially as viewed from the outer surface of the panel member, i.e. outwardly through the window. As indicated above, the sun shield does not have any exposed surfaces or elements adversely affecting its handling when it is off of the window. The adhesive material is confined between the mounting strips and the panel member, and thus the exposed side 18b is devoid of such adhesive material or any other material that would adversely affect the handling of the device. Also as indicated above, the adhesive material does not adversely affect the static electricity properties of the cling material; it does not dissolve any portion of the cling strips or the panel member, being entirely nonsoluble relative thereto. Thus, when the mounting strips are in position secured to the panel member, in the completed device, they are fitted flat against the window, and since the static condition is not affected, the static holds the device in position thereon. It is relatively securely held thereon, that is, it will not shake loose, for example, and it will not be dislodged by incidental brushing one's hands against it, but it can be removed by merely peeling it off, by grasping a corner thereof and pulling it. The inner or exposed surface 18b of the mounting strips remain dry, and the entire sun shield can be handled in any way desired, such as rolling it into a roll and placing it in a suitable condition in the vehicle. When it is desired to use the sun shield again, it is merely unrolled and fitted to the window as referred to above. The sun shield therefore may be applied to the window, and removed therefrom, repeatedly, and practically numberless times.

I claim:

1. A sun shield comprising, a main panel member adapted to be applied to a window, and having a rear surface directed to the window when applied thereto, the main panel member being of translucent and tinted plastic material of other than cling material, mounting strips of cling material having static characteristics on the rear surface of the panel member, and being narrow relative to the outline dimensions of the main panel member, fitted face-to-face with the latter and positioned at the edges thereof, and contained within those dimensions, the portion of the main panel member to which the mounting strips are not applied being free of securement to the window, and adhesive material between the mounting strips and the main panel member engaging them both throughout their common areas, and securing them together and the sun shield being otherwise free of adhesive material and securing means, the adhesive material constituting the only means securing the mounting strips to the main panel member, and the mounting strips, with the adhesive material, constituting the only means securing the main panel member to the window.

2. A sun shield according to claim 1 wherein, the adhesive material is capable of adhering the mounting strips to the panel member without diminishing the static properties of the mounting strips and their capability of adhering as stated.

3. A sun shield according to claim 2 wherein, the mounting strips are of transparent and clear material.

4. A sun shield according to claim 3 wherein, the adhesive material is transparent and clear.

5. A sun shield according to claim 2 wherein, the adhesive material is capable of adhering to the panel member and to the mounting strips without penetrating into the material of either of them with totally non-soluble effect and thereby capable of securing the mounting strips to the panel without adversely affecting the characteristics either of them possessed before so securing them together.

6. A sun shield according to claim 3 wherein, the adhesive material is pressure sensitive.

7. A sun shield according to claim 3 wherein, the adhesive material is water clear.

8. A sun shield according to claim 1 wherein, the panel member is made up of co-extruded polyester.

9. A sun shield according to claim 1 wherein, the panel member is made up of acetate.

10. A sun shield according to claim 1 wherein, the panel member is made up of polycarbonate.

* * * * *